United States Patent [19]

Ward

[11] Patent Number: 4,531,584
[45] Date of Patent: Jul. 30, 1985

[54] DOWNHOLE OIL/GAS SEPARATOR AND METHOD OF SEPARATING OIL AND GAS DOWNHOLE

[75] Inventor: James E. Ward, Houston, Tex.

[73] Assignee: Blue Water, Ltd., Houston, Tex.

[21] Appl. No.: 577,554

[22] Filed: Feb. 6, 1984

Related U.S. Application Data

[63] Continuation of Ser. No. 546,290, Oct. 28, 1983.

[51] Int. Cl.$^3$ .............................................. E21B 43/38
[52] U.S. Cl. ................................. 166/265; 166/105.5
[58] Field of Search .................... 166/265, 369, 105.5, 166/105.6; 55/199, 399, 447, 456, 457

[56] References Cited

U.S. PATENT DOCUMENTS

| | | | |
|---|---|---|---|
| 1,279,758 | 9/1918 | Putnam | 166/265 |
| 1,804,554 | 5/1931 | Dubbs | 55/457 |
| 2,147,671 | 2/1939 | Pratt | 55/457 |
| 2,349,164 | 5/1944 | Gilbert | 166/105.5 |
| 2,398,339 | 4/1946 | Watts | 166/105.5 |
| 2,652,130 | 9/1953 | Ferguson | 166/265 |
| 3,128,719 | 4/1964 | Jongbloed et al. | 166/105.5 |
| 4,074,763 | 2/1978 | Stevens | 166/325 |

Primary Examiner—Stephen J. Novosad
Assistant Examiner—Bruce M. Kisliuk
Attorney, Agent, or Firm—Pravel, Gambrell, Hewitt & Kimball

[57] ABSTRACT

For low pressure gaseous wells, an oil/gas separator is mounted at the end of a production string to provide a continuous upwardly spiralling separating velocity to the oil/gas entering the tool in order to separate outwardly at least sufficient gas to reduce gas lock in the sucker rod pump mounted in the production string. The oil/gas separator of this invention includes a separation chamber having a continuously upwardly spiralling ramp and an internal collection tube to collect the separated gas and move the gas upwardly and out of the tool and into the annulus of the oil well. The method of this invention is practiced by directing an oil/gas mixture from a producing zone in a helical direction to impart centrifugal separating velocity at varying levels to the mixture to cause gas to separate from the mixture.

23 Claims, 7 Drawing Figures

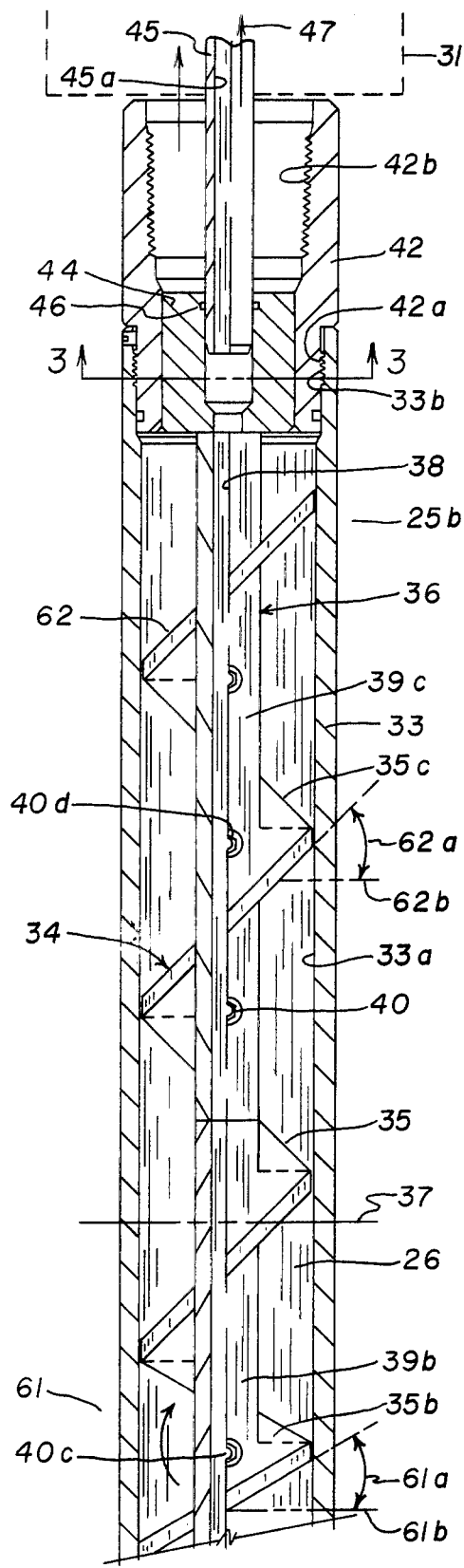
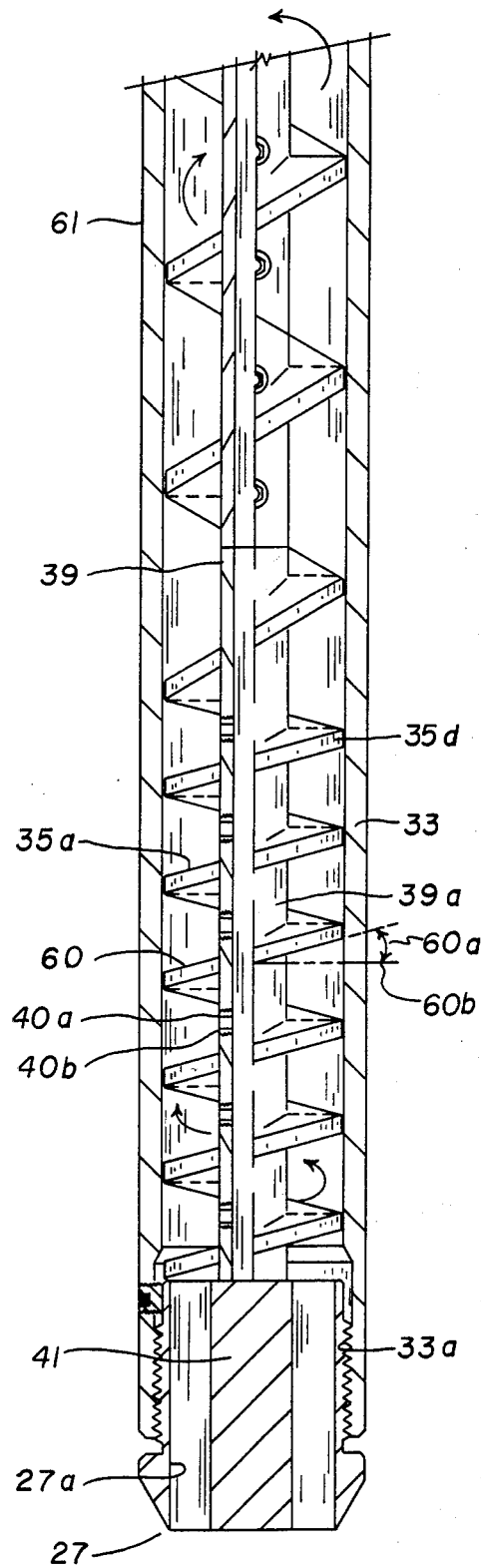
FIG. 2B
FIG. 2C

DOWNHOLE OIL/GAS SEPARATOR AND METHOD OF SEPARATING OIL AND GAS DOWNHOLE

CROSS-REFERENCE TO RELATED PATENT APPLICATIONS

This patent application is a continuation of U.S. patent application Ser. No. 546,290 filed in the U.S. Patent and Trademark Office on Oct. 28, 1983 and entitled Cyclone Downhole Gas/Liquids Separator.

FIELD OF THE INVENTION

This invention relates to the separation of gas from an oil/gas mixture exiting the production zone of an oil/gas well or analogous applications.

BACKGROUND OF THE INVENTION

It is known that certain oil/gas wells produce from low pressure formations require artificial lift such as downhole pumping in order to bring the oil/gas to the surface for recovery. It is also necessary to use downhole pumping equipment in some oil/gas wells which have become low pressure as a result of the formation being somewhat expended. Typically, such low pressure wells utilize downhole pumping units for such artificial lift, sometimes referred to as "sucker rod" pumps to pump out the oil and gas from the formation. The sucker rod pump is mounted downhole in the area of the production zone near the end of production tubing which extends to the surface. The sucker rod pump mounted near the end of the production tubing is driven by a sucker rod which extends to and is driven by a surface pumping unit. Typically, the sucker rod pumps are two cycle pumps wherein fluid is removed upwardly through the tubing during the upstroke and the downstroke is a return of the lifting valve and fluid carrying piston to the bottom of its stroke.

In such a low pressure oil well which also contains gas, the sucker rod pump also brings to the surface the gas as well as oil. However, the presence of the gas which tends to come out of the oil/gas mixture as it leaves the formation and enters the borehole, can cause operating problems to the sucker rod pump. In such wells, gas can become trapped in the pump chamber causing a loss of efficiency and even a locking of the sucker rod piston, which can cause damage to the sucker rod and to the pumping unit itself. Gas lock is such a common phenomenon in sucker rod pumps that many wells cannot be produced because they contain too much gas.

Efforts have been made to separate out the gas from the oil/gas mixture coming out of the production zone and entering into the sucker rod pump. For example, U.S. Pat. No. 4,074,763 discloses a tool to be mounted near the end of the production string utilizing a series of concentric conduits for separating gas out of the oil/gas mixture utilizing centrifugal force. U.S. Pat. No. 4,074,763 requires that the oil/gas mixture travel initially downwardly with the separated oil reversing direction for removal.

SUMMARY OF THE INVENTION

It is an object of this invention to provide a new and improved oil/gas fluid separator adapted to be mounted downhole in an oil/gas well in order to separate from the oil/gas mixture exiting the formation sufficient gas to substantially avoid gas lock in a downhole pumping unit. This object and other objects of this invention is accomplished by a fluid separator of the preferred embodiment of this invention which is adapted to be mounted in a producing oil/gas well for substantially separating gas from oil coming out of the producing zone of the well. The fluid separator includes a generally cylindrical housing forming a separating chamber. The housing includes an inlet adapted to receive oil/gas from the producing zone for introduction into the separation chamber. The housing includes an oil flow outlet for directing separated oil outwardly of the housing and a gas flow outlet for directing outwardly separated gas. A continuous flow separation means is mounted within the separation chamber for receiving the oil/gas mixture from the inlet, at least partially separating gas from the oil/gas mixture and directing separated oil out of the oil flow outlet and separated gas out of the gas flow outlet. The continuous flow separation means includes means for imparting a helical velocity to the entering oil/gas mixture to cause a separation of the oil and gas of the mixture and means are provided for directing the separated oil to the oil flow outlet and the separated gas to the gas flow outlet.

This general description of the invention is not inclusive of all patentable features of this invention. The description of the preferred embodiment to follow will describe in detail the features of the invention and the claims following the description of the preferred embodiment will set forth the features of this invention believed to be patentable.

BRIEF DESCRIPTION OF THE DRAWINGS

FIGS. 2B and 2C are sectional views of the middle and lower portions of the lower section of the oil/gas separator of the preferred embodiment of this invention;

DESCRIPTION OF THE PREFERRED EMBODIMENT

Figure 1:
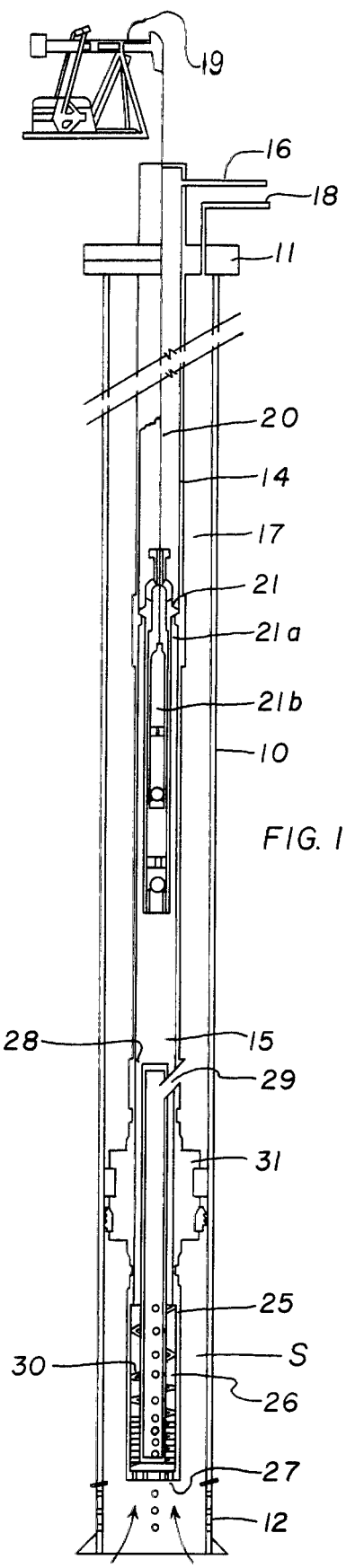
FIG. 1 is a schematic view of a production well bore illustrating the position of a sucker rod pump in relation to the oil/gas separator of the preferred embodiment of this invention.

Referring to the drawings and in particular to FIG. 1, the oil/gas separator S of the preferred embodiment of this invention is illustrated in its position downhole in a producing oil/gas well, which is schematically illustrated. The casing 10 is set from the surface equipment 11 and extends down to the producing zone 12. Production tubing 14 extends downwardly from the surface equipment at 11 to the area of the producing zone 12. The production tubing is a series of joints screwed together to form a hollow, cylindrical production passageway 15 upwardly to surface collection equipment illustrated schematically by the collection line at 16. The production tubing 14 is of a smaller external diameter than the casing 10 such that an annular area or "annulus" 17 is formed between the casing and production tubing. An annulus collection line 18 is also illustrated schematically to collect gas from the annulus.

Low pressure oil/gas producing wells have previously been described. Typically such low pressure wells are wells which have been produced for long periods of time so that the initial formation pressure has now also been expended or, are wells which are producing from inherently low pressure producing zones. In such low pressure wells, it is well known to utilize a pumping unit 19, which drives a rod or shaft 10 which extends from the pumping unit downwardly through the production tubing to a pump schematically illustrated at 21. The shaft or rod 20 is commonly called a "sucker rod" and the pump 21 is commonly called a "sucker rod pump". Typically, the sucker rod pump includes an outer housing 21a which mounts pumping piston 21b which is operably connected to the sucker rod 20 for movement between an up position at the end of the up stroke and a down position at the end of the down stroke. Typically, such sucker rod pumps collect oil within the housing 21a during the down stroke of the piston 21b and pump oil outwardly of the pump housing 21a and into the production tubing passageway 15 during the upstroke so that the oil is collected from the surface line 16.

In many low pressure wells where gas is being produced along with oil, the gas tends to come out of the oil due to the low pressure of the well and may cause gas lock in the sucker rod pump. Gas lock can reduce the efficiency of the pump substantially and gas lock can even cause damage to the pump or the sucker rod itself. In very gaseous wells, the problem of gas lock in the sucker rod pump can be of such severity that the well has to be shut in.

The oil/gas separator S of the preferred embodiment of this invention is adapted to be mounted at the end of the production tubing or string 14 in an area adjacent to the producing zone 12 in order to receive the oil/gas mixture flowing from the production zone 12 and separate sufficient gas out of the oil/gas mixture to avoid gas lock in the sucker rod pump 21. The oil/gas separator S of the preferred embodiment of this invention includes a housing generally designated at 25 having a separation chamber 26 formed therein. The housing 25 includes an upper section illustrated in FIG. 2A and a lower section illustrated in FIGS. 2B and 2C, which together form the lower housing section. The housing further includes an inlet 27 at the lower end of lower housing section 25b and an oil flow outlet 28 and a gas flow outlet 29 located in the upper section 25a of the housing in order to direct outwardly the substantially separated oil and gas. A continuous flow separation means generally designated as 30 is mounted within the separation chamber 26 for receiving the oil/gas mixture from the the inlet and for separating gas from the oil/gas mixture and directing outwardly the separated gas. The oil/gas separator S further includes a zone separation means generally designated as 31 mounted with the housing 25 for sealing off the annulus 17 between the production tubing 14 and the casing 10 to separate the producing zone 12 and housing section 25b from housing section 25a.

Figure 2A:
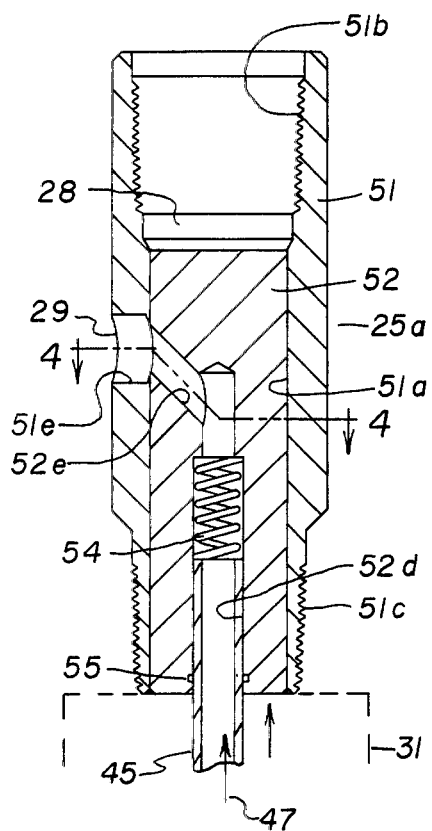
FIG. 2A is a sectional view of the upper section of the oil/gas separator of the preferred embodiment of this invention.

Referring to FIGS. 2B and 2C, the lower housing section 25b includes a generally cylindrical outer housing member 33 having a cylindrical interior wall surface 33a forming the cylindrical separation chamber designated as 26 therein. The continuous flow separation means which has been generally designated as 30 includes means generally designated as 34 for receiving oil/gas mixture entering through housing inlet 27 and for imparting a helical velocity to the oil/gas mixture in order to separate gas from the oil and direct the oil to the oil flow outlet 28 and gas to the gas flow outlet 29 (FIG. 2A). The means generally designated as 34 for imparting a helical velocity to the incoming oil/gas mixture includes a helical ramp 35 which winds upwardly through the separation chamber 26 within the cylindrical housing 33 for imparting a helical or spiral velocity to the incoming oil/gas mixture in order to at least partially separate gas from the oil/gas mixture. The continuous flow separation means 30 further includes a collection means generally designated as 36 for collecting the separated gas and directing the separated gas to the housing gas flow outlet 29.

The helical ramp 35 is a continuous ramp extending upwardly through the collection chamber 26 and having a varying incline with respect to a plane 37 transverse to the longitudinal axis 38 of the housing 33. The collection means 36 includes an internal collection tube 39 which is mounted centrally in the separation chamber 26 with the spiral ramp 35 winding between the internal collection tube 39 and the inside wall 33a of the housing 33. The central or internal collection tube 39 includes a series of openings 40 which allow for the migration of gas radially inwardly into the central collection tube 39 as the oil/gas mixture is directed into a spiralling velocity upwardly through the separation chamber 26.

The inlet 27 is a series of ports or bores such as 27a which are formed in a bottom nose piece 41 which is threadedly mounted into an internally threaded lower end 33a of the housing 33.

An intermediate coupling 42 is externally threaded at its lower end 42a and is screwed into a internally threaded upper portion 33b of the housing 33. The coupling 42 includes an upper internally threaded portion 42b which is threadedly connected with a suitable packer which forms the zone separation means 31. The zone separation means or packer 31 is illustrated in dashed lines in FIGS. 2b and 2a. The packer 31 is of any suitable variety adapted to fit the particular well conditions encountered. The packer 31 is designed to provide for fluid flow between the lower housing section 25b of the oil/gas separator S and the upper housing section 25a and to seal off the annulus 17 so that the lower housing inlet 27 is sealed off and separated from the upper housing section oil flow outlet 28 and gas flow outlet 29. An example of a particular packer that is suitable under certain well conditions is Baker Packer Model "AD-1" Tension Packer Product No. 739-08 of Baker Oiltools Co., located on page 845 of the Composite Catalog, 1982–83.

Figure 3:
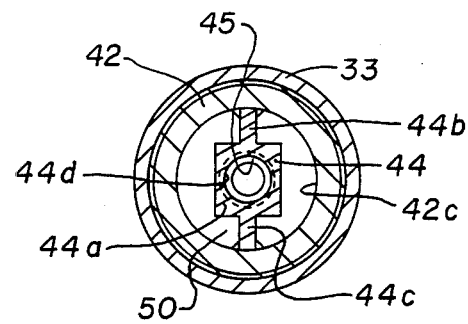
FIG. 3 is a sectional view taken along line 3—3 of FIG. 2B.

The intermediate coupling 42 has mounted therein a lower vent tube mounting block 44 which is illustrated in FIGS. 2B and 3. Referring to FIG. 3, the lower vent tube mounting block 44 includes a generally rectangular portion 44a having mounting lugs 44b and 44c which extend in diametrically opposite directions from the central rectangular block portion 44a and which are welded to the internal wall 42c of the intermediate couplings 42. The central portion 44a of the mounting block 44 includes a central, internal bore 44d which extends all the way longitudinally through the rectangular block 44a and which has mounted in the upper portion thereof the lower end of a vent tube 45. An O-ring type seal 46 is mounted in the wall 44d to provide a seal between the wall 44d and the lower end of the vent tube 45.

The vent tube 45 is a hollow cylindrical tube having a central passageway 45a in fluid communication through mounting block bore 44d with the central passageway in the internal collection tubular member 39 so that gas collected within the tubular member 39 is directed upwardly through the vent tube 45 and outwardly through outlet 29 in the upper housing section 25a. Arrow 47 shown at the top of FIG. 2B and at the bottom of FIG. 2A indicates the direction of flow upwardly through the vent tube 45 of collected gas which flows outwardly through the upper section housing outlet 29. The packer which forms the zone separation means 31 includes a central tubular member (not shown) which confines the flow of oil flowing upwardly and outwardly of the collection chamber 26, through the bore area 50 between the lower vent mounting block 44 and the internal wall 42c of the intermediate coupling 42 and upwardly through the packer.

Figure 4:
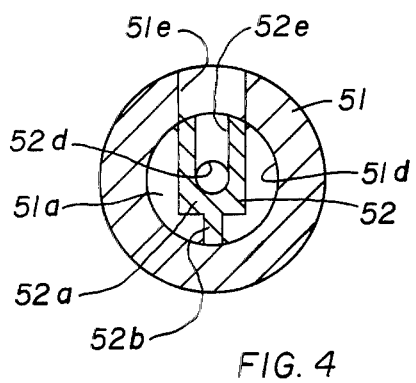
FIG. 4 is a sectional view taken along line 4—4 of FIG. 2A.
Figure 5:
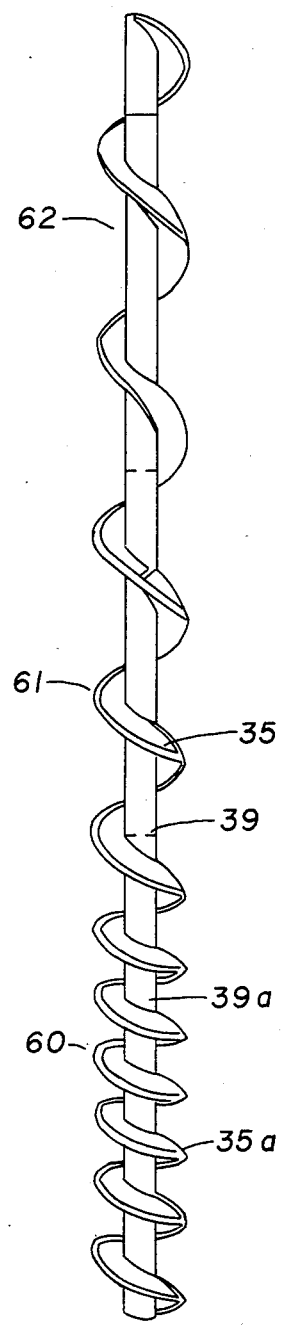
FIG. 5 is a perspective view of the continuous helical ramp and internal collection tube to be mounted in the separation chamber of the housing of the preferred embodiment of this invention.

Referring to FIGS. 2A and 4, the separated oil flows through the packer 31 and upwardly into a central bore 51a (FIG. 4) of upper vent head housing member 51. The upper vent head housing member 51 is a threaded coupling having at its upper end an internally threaded portion 51b adapted to be connected to the end of the production tubing 14. The threaded coupling 51 has at its lower end 51C an externally threaded portion adapted to be coupled to the packer of the zone separation means 31. The upper vent head housing member or coupling 51 includes an internal bore 51a formed by cylindrical internal wall 51d. An upper vent tube mounting member 52 is mounted within the bore 51a. The upper vent tube mounting member 52 is generally rectangular in configuration and includes a main rectangular portion 52a and a lug portion 52b. The upper vent tube mounting member 52 is welded at its ends onto the internal wall 51d of the upper vent head housing member 51. The vent tube mounting member 52 includes a longitudinally directed bore portion 52d which extends from the bottom of the mounting member upwardly about ¾ of the length of the mounting member. An inclined bore portion 52d extends between the top of the longitudinally directed bore 52d radially outward at an upwardly inclined angle to meet with an opening 51e in the coupling 51.

The longitudinal bore 52d receives the upper end of vent tube 45. A spring 54 is mounted between an end shoulder at the end of the bore 52d and the upper end of the vent tube 45 to bias the vent tube downwardly into the bore 44d in the lower vent tube mounting block 44. An O-ring type seal 55 is machined into the bore 52d to provide a seal between the wall of the bore 52d and the upper end of the vent tube 45. The purpose of the spring is to prevent vibration or chatter and to keep the vent tube within its respective mounting bores 52d and 44d with various sizes of packers. In this manner, the gas flow outlet defined as 29 may, in cooperation with the vent tube 45, provide for the diversion of gas collected by the oil/gas separator tool S into the annulus 17 outside of the production string 14 for possible collection of the gas through surface line 18 or other disposition thereof.

Referring now to FIGS. 2B and 2C, the continuous flow separation means 30 is illustrated as being divided into a plurality of stages, namely three, in the preferred embodiment of this invention. Although the number of stages may be changed, the preferred embodiment of this invention will be described in terms of the three stages illustrated for the continuous flow separation means 34. The three stages are designated generally by the numbers 60 for the first stage, 61 for the second stage and 62 for the third stage of the continuous flow separation means. Each stage 60, 61 and 62 is formed of part of the helical ramp previously identified as 35 and an internal collection tube previously identified as 39. The first separation stage 60 includes continuous ramp portion 35a and internal collection tube portion 39a. The continuous ramp portion 35a is a helical ramp extending from the bottom of the collection chamber 26 upwardly. The angle of incline of the first ramp 35a with respect to a plane 60b transverse through the tool is an angle 60a less than the angle of the ramp portions in the second and third stages. The continuous ramp portion 35a is machined at its exterior edge 35d so as to provide a metal-to-metal seal against the internal wall 33a of the housing member 33 such that a sprial passageway or tunnel is formed by the continuous ramp portion 35a. In this manner, as the oil/gas mixture enters into the separation chamber 26 and moves spirally upwardly along the spiral tunnel formed by the continuous ramp portion 35a, the oil/gas mixture is accelerated and the pressure is reduced such that the gas in the oil/gas mixture migrates radially inwardly and the heavier liquid is moved by centrifugal force outwardly toward the inside wall 33a. In the embodiment illustrated in FIG. 2C, the angle 60a is 15°. The number of steps or turns of the spiral portion 35a is about 6½.

The internal collection tube 39a for stage 60 has six openings 40a. Actually, each of the openings in the various internal collection tube sections such as 39a is the same size, with each hole being threaded to receive an insert 40b having the predesignated internal port or opening to provide the port size desired at each stage. In the embodiment illustrated in FIG. 2C, the internal diameter of each insert is ¼ inch. The lower end of the internal collection tube portion 39a is seated onto the top face of the inlet nose piece 41. It is further noted that the entire continuous ramp portion 35a is radially inclined to slope downwardly at all levels of the continuous ramp. In this manner, the trapping of particles, paraffin or heavy fluids in areas adjacent to the internal collection tube portion 39a and the openings 40a is avoided.

Referring to FIGS. 2B and 2C, the second separator stage 61 includes continuous ramp portion 35b and internal collection tube portion 39b. The continuous ramp portion 35b has a continuous incline at an angle 61a with respect to a transverse plane 61b which is greater than the angle 60a. The greater angle of inclination 61a provides for a fewer number of turns or steps over the length of the internal collection tube 39b as compared to the number of turns of ramp 35a over the length of internal collection tube 39a. In the preferred embodiment illustrated in FIGS. 2B and 2C, the number of turns of the continuous ramp portion 35b in the second stage 61 is about 3½ turns. The angle 61a is about 30° in the second stage 61.

The internal collection tube 39b includes series of five ports 40c formed by inserts 40b which are the same as the inserts used in the first stage except that the internal diameter of the inserts 40b have ports 40c of less internal diameter than the inserts in openings 40a. In the embodiment illustrated, the internal diameter of the inserts of ports 40c is ⅛ inch. The fewer number of ports 40c and the smaller internal diameter of each of the ports provides for the migration of a lesser amount of gas into the internal collection tube portion 39b in this second stage.

In the third stage 62, the continuous ramp portion 35c has a continuous incline at angle 62a with respect to a transverse plane 62b, which angle 62a is 45° and is therefore greater than the angle 61a. The number of turns of the continuous ramp portion 35c for the same length of internal collection tube 39c as in the other stages is less; namely, in the preferred embodiment illustrated in FIG. 2B, the number of turns of the continuous ramp 39c is two. The internal collection tube 39c includes three openings 40d each of which has an insert 40b of a diameter less than the diameter of the inserts used in openings 40c in the second stage. In the embodiment illustrated, the diameter of the inserts used in openings 40d in the third stage is 1/16 of an inch. Thus, the number of openings 40d as well as the diameter thereof is smaller than the number of openings 40c and the diameter thereof in the second stage 61 so that even less gas migrates into the internal collection tube portion 39c.

Thus, the collection chamber 26 has mounted therein three separate stages of continuous ramp portions 35a–c and internal collection tubes 39a–c to provide a continuous ramp 35 and a continuous internal collection tube 39 within the separation chamber 26. In operation, as the oil/gas mixture enters through the inlets 27a, the fluid is directed in a spiralling manner upwardly through the helical tunnel formed by the first continuous ramp portion 35a. As the oil/gas mixture moves upwardly, the separating or centrifugal velocity is increased and the pressure is decreased such that the gas in the oil/gas mixture migrates radially inwardly and the heavier fluids migrate outwardly as a result of centrifugal force; and, at least a portion of the separated gas moves through ports in inserts 40b into the internal collection tube portion 39a and upwardly through collection tube portions 39b and 39c into the vent tube 45 and outwardly of outlet 29 into the annulus 17. As the oil/gas mixture, with some gas removed, enters the second stage 61, the oil/gas mixture is moved at a slightly slower separating or centrifugal velocity due to the greater angle of inclination 61a such that somewhat less gas is separated in the second stage. The oil/gas mixture traveling in a spiralling manner upwardly through the second stage continuous ramp portion 35b has less centrifugal force action as compared to the first stage continuous ramp portion 35a. Similarly, the oil/gas mixture, with some more gas removed, moves along the third stage continuous ramp portion 35c at a reduced radial velocity with respect to its velocity in the second stage 61 and thus less gas is separated outwardly during this stage. Of course, the oil and gas mixture has had gas removed as it has travelled through the first and second stages 60 and 61 and thus has less gas remaining to be removed during its travel through the third stage. The purpose of the three stages, with the first stage imparting the greatest circumferential velocity and each subsequent stage importing a less circumferential velocity to the spiralling oil/gas mixture, is to cause the greatest amount of gas to be removed and collected in the internal collection tube 39a during the first stage. The staged reduction in velocity during the second and third stage also permits residual separated gas that did not enter the collection tube to at least partially re-enter the liquid solution.

The gas separated in all three stages 60–62 is collected within the internal collection tube portions 39a–c and travels upwardly through the passageway 45a within the vent tube 45 and outwardly through bore 51e in the upper vent mounting block and outwardly through opening 29 in the upper vent head member 51. The oil remaining travels upwardly and outwardly of the final ramp portion 35c into the bore 50 formed between the lower vent tube mounting member 44 and internal wall 42c of the intermediate coupling 42, through the packer of the zone separation means 31, into the bore or passageway 51a and outwardly of the oil/gas separator tool into the production tubing 14 for collection and pumping upwardly by the sucker rod pump 21.

It should be noted that the it is the purpose of the oil/gas separator S to remove sufficient but not necessarily all gas and to divert such gas into the annulus 17 to prevent gas lock in the sucker rod pump 21. The continuous flow of the oil/gas mixture through the oil/gas separator tool S cycles along with the cycling of the sucker rod pump 21. In this manner, the oil/gas mixture enters the entry ports 27a of the tool S during the upstroke of the sucker rod pump 21 and the fluid may be substantially at rest during the down stroke of the sucker rod pump 21. While this may lead to the collection of some liquid within the internal collection tube 39a of the first stage 60, such liquid is removed from the internal collection tube and travels upwardly during the upstroke. It should be noted that one of the features of the providing of the continuous ramp to impart a spiralling velocity is to provide a flow path from the outlet 29 of the oil/gas separator tools down through the tool to the inlet ports 27a so that a fluid treatment can be directed downwardly through the annulus 17, into the outlet 29 of the tool S and downwardly through the tool and outwardly of the bottom tool inlet ports 27a. Thus treatment such as the providing of hot oil to clean paraffin or various chemical treatments may be accomplished with the oil/gas separator S in position in the well. Such reversibility and reverse flow through the separator S is not possible in U.S. Pat. No. 4,074,763 which has a check valve to prevent reverse flow.

It is within the scope of this invention to vary the number of stages of the oil/gas separator S. In the embodiment illustrated in FIGS. 2A–C, the number of stages 60–62 are three. However, it is contemplated to use more than three or as few as two stages in the tool S. Additionally, the angle of inclination of the continuous ramp 35 may be varied within each stage and from stage to stage such that, depending on well conditions and the amount of gas in the oil/gas mixture coming out of the producing zone in a particular well, the angles of inclination of the continuous ramp portions such as 35a–c may be varied for maximum efficiency. Additionally, it is within the scope of the invention to vary the number of openings 40a in the internal collection tube portions 39a–c and, additionally, the size of the openings or ports may be varied within each stage so that the amount of gas collected in each stage can be adjusted as desired.

Thus in accordance with this invention, a method of separating gas from the oil/gas mixture exiting the production zone 12 of an oil/gas well is provided. An oil/gas separating tool S is mounted at the end of a production tubing 14 below a sucker rod pump. The oil/gas separating tool S is provided with a continuous ramp portion 35 to impart centrifugal force to the oil/gas mixture as it spirals upwardly at a velocity that can be varied according to well conditions. The actual magnitude of spiral velocity is varied in stages as the mixture travels along the continuous ramp with the maximum separation velocity being just after entry of the mixture into the tool. The spiral staged velocity is imparted to the oil/gas mixture to impart centrifugal force to the mixture so that the heavier fluids migrate outwardly to an annular collection zone and the lighter gas migrates inwardly to be collected within the internal collection zone or tube 39. The amount of gas collected may be varied by varying the number of openings or ports and the size of openings within the internal collection tube 39 at each of the various stages. The separated gas is circulated outwardly of the tool S and into the annulus above a zone separation means or packer 31 in order to divert the gas out of the production string and upwardly into the annulus of the oil/gas well thus leaving a more dense and less gaseous oil mixture to travel upwardly into the subsurface or sucker rod pump to be pumped through the production tubing up to the surface for collection.

The foregoing disclosure and description of the invention are illustrative and explanatory thereof, and various changes in the size, shape and materials, as well as in the details of the illustrated construction may be made without departing from the spirit of the invention.

It is claimed:

1. A fluid separator adapted to be mounted in a producing oil/gas well for substantially separating gas from oil of a oil/gas mixture, comprising:
   a generally cylindrical housing forming a separation chamber, said housing having an inlet at the bottom of said housing located below said separation chamber adapted to receive an oil/gas mixture for introduction into said separation chamber;
   said housing including an oil flow outlet for directing separated oil outwardly of said housing and a gas flow outlet for directing outwardly separated gas, said oil and gas flow outlets being located above said separation chamber;
   continuous flow separation means mounted with said separation chamber for receiving said oil/gas mixture from said inlet, for separating gas from the oil/gas mixture and for directing separated oil out of said oil flow outlet and separated gas out of said gas flow outlet;
   said continuous flow separation means including means for imparting an upward helical velocity to said entering oil/gas mixture to cause a separation of said oil/gas mixture into oil and gas and means for directing separated oil to said oil glow outlet and separated gas to said gas flow outlet;
   said inlet, oil flow outlet, separation chamber and continuous flow separation means cooperating to provide fluid treatment means through said separator for delivering downwardly through said separator oil well treatment fluid;
   said continuous flow separation means includes a plurality of separation stages positioned in said housing separation chamber between said inlet and said outlets; and
   said plurality of separation stages mounted within said separation chamber including a first stage for imparting the greatest separation velocity and making the greatest separation of gas from said oil/gas mixture and with each stage thereafter located between said first stage and said outlets successively imparting lesser velocity and lesser separation such that said gas is removed from said oil/gas mixture in stages.

2. The structure set forth in claim 1, comprising:
   said generally cylindrical housing being adapted to be mounted in a production string of an oil/gas well below a downhole pumping unit also mounted in the production string.

3. The structure set forth in claim 2, including:
   said generally cylindrical housing including means for having a zone separation means mounted with said housing such that said inlet is positioned on one side of said zone separation means and said oil flow and gas flow outlets are positioned on the other side of said zone separation means.

4. The structure set forth in claim 3, including:
   said housing mounting said oil flow outlet in fluid communication with such downhole pumping unit to provide oil to said pumping unit sufficiently free of gas to avoid gas lock in said pumping unit.

5. The structure set forth in claim 4, including:
   said housing mounting said gas flow outlet for exit of said separated gas outside of such production string.

6. The structure set forth in claim 1, including:
   said housing including a first section and a second section;
   said second section of said housing being a generally cylindrical member having said generally cylindrical separation chamber formed therein and having said inlet in fluid communication with said separation chamber;
   said continuous flow separation means including a helical ramp for receiving and imparting a helically directed velocity to said oil/gas mixture entering through said housing inlet in order to at least partially separate said oil from said gas; and
   said continuous flow separation means further including means for collecting said separated gas and directing said separated gas to said gas flow outlet.

7. The structure set forth in claim 6, including:
   said means for collecting said separated gas including an internal collection tube mounted with said helical pump; and
   said gas flow outlet is mounted with said first housing section in fluid communication with said internal collection tube.

8. The structure set forth in claim 7, including:
   said internal collection tube is positioned within and extends longitudinally of said cylindrical separation chamber; and
   said helical ramp is mounted between said internal collection tube and the inside wall of said second section housing forming said cylindrical separation chamber to form a continuous helical ramp to receive said oil/gas mixture from said housing inlet and direct said oil/gas mixture along said continuous helical ramp to thereby impart a helically directed velocity to said oil/gas mixture to cause at least a partial separation of oil from gas.

9. The structure set forth in claim 8, wherein:
   said internal collection tube including a series of ports to allow said separated gas to move radially inwardly into said internal collection tube.

10. The structure set forth in claim 6, including:
    said helical ramp having a variable incline in order to impart different velocities to said oil/gas mixture.

11. The structure set forth in claim 6, including:
said continuous flow separation means having said first and a second stage, said helical ramp imparting a greater centrifugal velocity to said oil/gas mixture in said first stage than in said second stage.

12. The structure set forth in claim 11, wherein said continuous flow separation means include:
said first stage including a first continuous helical ramp having a first central collection tube with a series of ports, said first helical ramp and first collection tube being mounted in said housing separation chamber adjacent to said housing inlet in order to first receive said oil/gas mixture entering said housing through said inlet; and
said second stage including a second continuous helical ramp having a second control collection tube with a series of ports, said second continuous helical ramp being mounted in said housing separation chamber adjacent to said first continuous helical ramp to receive a partially separated oil/gas mixture from said first helical ramp and first central collection tube.

13. The structure set forth in claim 12, including:
said first helical ramp having a lesser incline with respect to a transverse plane of said housing than said second helical ramp to thereby impart a greater centrifugal velocity to said oil/gas mixture during travel along said first helical ramp than said second helical ramp.

14. The structure set forth in claim 13, wherein:
said first and second helical ramps are radially inclined from said first and second central collection tubes outwardly toward said housing.

15. The structure set forth in claim 14, wherein:
said first and second helical ramps are radially inclined from said central collection tubes toward said housing inlet.

16. The structure set forth in claim 12, wherein:
said first collection tube including a series of ports positioned along the length of said first collection tube;
said second collection tube including a series of ports positioned along the length of said second collection tube.

17. The structure set forth in claim 12, including:
said first continuous helical ramp of said first stage traversing about said first collection tube a first number of turns; and
said second continuous helical ramp traversing about said second central collection tube a second number of turns, said second number of turns being fewer than said first number of turns whereby said first helical ramp imparts a greater centrifugal velocity to said oil/gas mixture during travel along said first helical ramp than said second helical ramp.

18. A method of separating oil and gas from oil/gas mixture downhole in a producing oil well, comprising the steps of:
providing a production string extending from the surface into the borehole and terminating in the production zone;
mounting an oil/gas separator onto the end of the production string and installing a packer between a lower and upper section of the oil/gas separator such that the inlet of the oil/gas separator is located below the packer and the outlets therefor are located above the packer;
providing for the entry of producing oil/gas mixture into the lower section of the oil/gas separator and providing a helical annular velocity tunnel through the oil/gas mixture to cause said oil under centrifugal force to move radially outwardly and causing said separated gas to move radially inwardly into a central collection zone in said lower section of the oil/gas separator so that the separated gas in said lower section of the oil/gas separator is directed through the packer and outwardly of the oil/gas separator above the packer;
directing the oil separated in said lower section upwardly through the packer and into the end of the production tubing so that such oil can be pumped upwardly by a downhole pump mounted in the production tubing; and
providing the annular helical velocity tunnel within the oil/gas separator in a series of stages, the lowest stage in the oil/gas separator imparting the greatest separating velocity to the oil/gas mixture entering the oil/gas separator with subsequent, upper stages providing decreasing separating velocity by stage.

19. The method according to claim 18 further including the steps of:
providing said helical velocity tunnel in a series of variable velocity stages such that the incoming oil/gas mixture is increased to its highest separating velocity in the incoming stage and gradually reduced in velocity as such separated oil/gas mixture reaches the end of the oil/gas separator.

20. The method set forth in claim 18, comprising the steps of:
adjusting the acceleration and velocity of the oil/gas mixture entering the oil/gas separator by varying the angle of inclination of the helical tunnel.

21. The method set forth in claim 18, comprising the steps of:
varying the amount of gas collected from the separation within the central collection zone by varying the area of open fluid transfer between the helical annular velocity tunnel and an internal collection tube.

22. A fluid separator adapted to be mounted in a producing oil/gas well for substantially separating gas from oil of a oil/gas mixture, comprising:
a generally cylindrical housing forming a separation chamber, said housing having an inlet at the bottom of said housing located below said separation chamber adapted to receive an oil/gas mixture for introduction into said separation chamber;
said housing including an oil flow outlet for directing separated oil outwardly of said housing and a gas flow outlet for directing outwardly separated gas, said oil and gas flow outlets being located above said separation chamber;
continuous flow separation means mounted with said separation chamber for receiving said oil/gas mixture from said inlet, for separating gas from the oil/gas mixture and for directing separated oil out of said oil flow outlet and separated gas out of said gas flow outlet,
said continuous flow separation means including means for imparting an upward helical velocity to said entering oil/gas mixture to cause a separation of said oil/gas mixture into oil and gas and means for directing separated oil to said oil flow outlet and separated gas to said gas flow outlet;

said inlet, oil flow outlet, separation chamber and continuous flow separation means cooperating to provide fluid treatment means through said separator for delivering downwardly through said separator oil well treatment fluid;

said continuous flow separation means including a first stage including a first continuous helical ramp having a first central collection tube with a series of ports, said first helical ramp and first collection tube being mounted in said housing separation chamber adjacent to said housing inlet in order to first receive said oil/gas mixture entering said housing through said inlet;

said continuous flow separation means including a second stage including a second continuous helical ramp having a second central collection tube with a series of ports, said second continuous helical ramp being mounted in said housing separation chamber adjacent to said first continuous helical ramp to receive a partially separated oil/gas mixture from said first helical ramp and first central collection tube;

said first collection tube including a series of ports positioned along the length of said first collection tube;

said second collection tube including a series of ports positioned along the length of said second collection tube; and the number of ports in said first collection tube is greater than the number of ports in said second collection tube.

23. A fluid separator adapted to be mounted in a producing oil/gas well for substantially separating gas from oil of a oil/gas mixture, comprising:

a generally cylindrical housing forming a separation chamber, said housing having an inlet at the bottom of said housing located below said separation chamber adapted to receive an oil/gas mixture for introduction into said separation chamber;

said housing including an oil flow outlet for directing separated oil outwardly of said housing and a gas flow outlet for directing outwardly separated gas, said oil and gas flow outlets being located above said separation chamber;

continuous flow separation means mounted with said separation chamber for receiving said oil/gas mixture from said inlet, for separating gas from the oil/gas mixture and for directing separated oil out of said oil flow outlet and separated gas out of said gas flow outlet;

said continuous flow separation means including means for imparting an upward helical velocity to said entering oil/gas mixture to cause a separation of said oil/gas mixture into oil and gas and means for directing separated oil to said oil glow outlet and separated gas to said gas flow outlet;

said inlet, oil flow outlet, separation chamber and continuous flow separation means cooperating to provide fluid treatment means through said separator for delivering downwardly through said separator oil well treatment fluid;

said continuous flow separation means including a first stage including a first continuous helical ramp having a first central collection tube with a series of ports, said first helical ramp and first collection tube being mounted in said housing separation chamber adjacent to said housing inlet in order to first receive said oil/gas mixture entering said housing through said inlet;

said continuous flow separation means further including a second stage including a second continuous helical ramp having a second central collection tube with a series of ports, said second continuous helical ramp being mounted in said housing separation chamber adjacent to said first continuous helical ramp to receive a partially separated oil/gas mixture from said first helical ramp and first central collection tube;

said first collection tube including a series of ports positioned along the length of said first collection tube;

said second collection tube including a series of ports positioned along the length of said second collection tube; and the size of said ports in said first collection tube being greater than the size of said ports in said second collection tube.

* * * * *